US006292377B1

United States Patent
Sasaki

(10) Patent No.: US 6,292,377 B1
(45) Date of Patent: Sep. 18, 2001

(54) POWER SUPPLY DEVICE

(75) Inventor: Masayoshi Sasaki, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/595,897

(22) Filed: Jun. 20, 2000

(30) Foreign Application Priority Data

Jun. 21, 1999 (JP) ................................. 11-174316

(51) Int. Cl.[7] ........................ H02M 3/335; H02M 7/538
(52) U.S. Cl. ................... 363/25; 363/71; 363/134
(58) Field of Search .............................. 363/25, 26, 21, 363/71, 127, 131, 133, 134, 72, 97

(56) References Cited

U.S. PATENT DOCUMENTS

| | | | | |
|---|---|---|---|---|
| 4,504,895 | * | 3/1985 | Steigerwald | 363/17 |
| 4,853,832 | * | 8/1989 | Stuart | 363/17 |
| 4,912,621 | * | 3/1990 | Kobayashi et al. | 363/71 |
| 5,036,452 | * | 7/1991 | Loftus | 363/71 |
| 5,583,753 | * | 12/1996 | Takayama | 363/71 |
| 5,604,669 | * | 2/1997 | Strong, III | 363/17 |
| 5,627,740 | * | 5/1997 | Johari | 363/78 |

* cited by examiner

Primary Examiner—Rajnikant B. Patel
(74) Attorney, Agent, or Firm—Ronald P. Kananen; Rader, Fishman & Grauer

(57) ABSTRACT

The switching converters of a power supply device are adapted to equally share the power output of the device. The power supply device 1 comprises a plurality of resonance type switching converters 4, 5 connected in parallel relative to a load, frequency control circuits 6, 7 for controlling respectively the switching frequencies of the switching converters 4, 5, a feedback circuit 8 for feeding back the voltage applied to the load and a resonance current balance circuit 9 for detecting the wave heights of the resonance currents flowing respectively through the switching converters 4, 5 and comparing them. The frequency control circuits 6, 7 control the switching frequencies so as to make the voltage applied to the load show a predetermined voltage value and also make the wave heights of the resonance currents equal to each other.

4 Claims, 6 Drawing Sheets

POWER SUPPLY DEVICE

BACKGROUND OF THE INVENTION

1. Field of the Invention

This invention relates to a power supply device comprising a plurality of resonance type switching converters connected in parallel.

2. Prior Art

Current resonance type switching converters are known. A current resonance type switching converter is realized by adding a resonance circuit to a switching transistor for the purpose of switching voltages. Current resonance type switching converters provide a major advantage that the electric current flowing through the primary side of the transformer shows a sinusoidal waveform to reduce the current loss and the switching noise due to switching operations because of the resonance circuit added to it.

Power supply devices realized by connecting a plurality of such current resonance type switching converters in parallel are also known. It is possible to supply a large power to a load when a plurality of current resonance type switching converters are connected in parallel.

FIG. 1 of the accompanying drawings shows a schematic circuit diagram of a known power supply device realized by connecting a pair of current resonance type switching converters.

The known power supply device 100 of FIG. 1 comprises an AC input terminal 102, a power factor improving circuit (P. F. C.) 103, a first current resonance type switching converter 104, a second current resonance type switching converter 105, a frequency control circuit 106 and a feedback circuit 107.

Typically a commercial AC voltage may be applied to the known power supply device 100 by way of the AC input terminal 102. The applied AC voltage is then fed to the power factor improving circuit 103. After boosting the applied AC voltage and improving its power factor, the power factor improving circuit 103 rectifies the AC and outputs a DC input voltage (Vin) that may be for instance as high as 380(V).

The DC input voltage (Vin) is then fed to the first current resonance type switching converter 104 and the second current resonance type switching converter 105. Note that, hereinafter, the first current resonance type switching converter 104 and the second current resonance type switching converter 105 are referred to simply as the first converter 104 and the second converter 105 respectively.

The first converter 104 is controlled for its switching frequency by a frequency control signal from frequency control circuit 106 and converts the DC input voltage (Vin) it receives into a DC output voltage (Vout) that is stabilized to show a predetermined voltage value. Similarly, the second converter 105 is also controlled for its switching frequency by a frequency control signal from the frequency control circuit 106 and converts the DC input voltage (Vin) it receives into a DC voltage (Vout) that is stabilized to show a predetermined voltage value. The output terminal of the first converter 104 and that of the second converter 105 are connected in parallel and are used to supply the load 101 with their respective DC outputs (Vout).

The first converter 104 is provided with a DC input terminal 111 and the DC input voltage (Vin) is applied to it by way of the input terminal 111. The first converter 104 is also provided with a control signal input terminal 112 and a frequency control signal is applied to it from the frequency control circuit 106 by way of the control signal input terminal 112.

The first converter 104 has a first switching transistor 113 and a second switching transistor 114. The collector of the first switching transistor 113 is connected to said DC input terminal 111. The collector of the second switching transistor 114 is connected to the emitter of the first switching transistor 113, which emitter is then grounded.

The first converter 104 also has a driving transformer 115 for driving the first switching transistor 113 and the second switching transistor 114.

The driving transformer 115 includes a primary winding 115a and a pair of secondary windings 115b, 115c. The primary winding 115a of the driving transformer 115 is fed with the frequency control signal sent from the frequency control circuit 106 by way of the control signal input terminal 112. The two secondary windings 115b, 115c of the driving transformer 115 are wound in opposite directions. One of the secondary windings, or the secondary winding 115b, is connected at an end thereof to the base of the first switching transistor 113 by way of resistor 116 and at the other end thereof to the emitter of the switching transistor 113. On the other hand, the other secondary winding, or the secondary winding 115c, is connected at an end thereof to the base of the second switching transistor 114 and at the other end thereof to the emitter of the second switching transistor 114.

The first switching transistor 113 and the second switching transistor 114 connected respectively to the two secondary windings 115b, 115c of the driving transformer 115 that are wound in opposite directions are complementarily switched according to the frequency control signal input to the primary winding 115a of the driving transformer 115.

The first converter 104 includes an insulating transformer 117, a resonance capacitor 118 arranged at the primary side of the insulating transformer 117 and first and second rectifier diodes 121 and 122 arranged at the secondary side of the insulating transformer 117.

The primary winding 117a of the insulating transformer 117 is connected at an end thereof to the emitter of the first switching transistor 113 and grounded at the other end thereof by way of the resonance capacitor 118 and resistor 120. The secondary winding 117b of the insulating transformer 117 is connected at an end thereof to the anode of the first rectifier diode 121 and at the other end thereof to the anode of the second rectifier diode 122. The cathode of the first rectifier diode 121 and that of the second rectifier diode 122 are connected to positive side output terminal 123, whereas negative side output terminal 124 is connected to the middle point of the secondary winding 117b of the insulating transformer 117.

When the first switching transistor 113 and the second switching transistor 114 of the first converter 104 having the above described configuration are complementarily and repeatedly turned on and off according to the frequency control signal from the frequency control circuit 106, a voltage having a rectangular waveform is applied to the opposite ends of the primary winding 117a of the insulating transformer 117. As a voltage having a rectangular waveform is applied, a resonance current having a sinusoidal waveform flows through the primary winding 117a as a concerted effect of the capacitance of the resonance capacitor 118 and the inductance of the insulating transformer 117. It should be noted that a resonance current flows through the primary winding 117a of the insulating transformer 117 only when such a voltage is applied to the opposite ends of thereof. As a resonance current flows through the primary winding 117a, the energy applied to the primary winding 117a is transferred to the secondary winding 117b to cause an electric current to flow therethrough. The electric current flowing through the secondary winding 117b is rectified by the two rectifier diodes 121, 122 and output from the positive side output terminal 123.

Load 101 is connected between the positive side output terminal 123 and the negative side output terminal 124 of the first converter 104 having the above described configuration. Additionally, a smoothing capacitor 125 is arranged between the positive side output terminal 123 and the negative side output terminal 124 so that a stabilized DC output current (Vout) is fed to the load 101 from the first converter 104 with a predetermined voltage value.

The second converter 105 has a configuration same as that of the first converter 104.

A DC input voltage (Vin) is applied to the DC input terminal 111 of the second converter 105 and a frequency control signal is fed from the frequency control circuit 106 to the control signal input terminal 112 of the second converter 105.

The load 101 is also connected between the positive side output terminal 123 and the negative side output terminal 124 of the second converter 105 having the above described configuration. Additionally, a smoothing capacitor 125 is arranged between the positive side output terminal 123 and the negative side output terminal 124 so that a stabilized DC output current (Vout) is fed to the load 101 from the second converter 105 with a predetermined voltage value.

The feedback circuit 107 has a differential amplifier 131, a reference voltage source 132 and a photocoupler 133.

The inverting input terminal of the differential amplifier 131 is connected to the connection point of potential dividing resistors 136 and 137 for dividing the DC output voltage (Vout) applied to the load 101. The non-inverting input terminal of the differential amplifier 131 is connected to the reference voltage source 132 adapted to generate reference voltage (Vref).

The photocoupler 133 has a light emitting element which is a light emitting diode 134 and a light receiving element which is a phototransistor 135. The anode of the light emitting diode 134 of the photocoupler 133 is connected to the positive side output terminals 123 of the first and second converters 104 and 105. The cathode of the light emitting diode 134 of the photocoupler 133 is connected to the output terminal of the differential amplifier 131 by way of resistor 138. The emitter of the phototransistor 135 of the photocoupler 133 is grounded. The collector of the phototransistor 135 of the photocoupler 133 is connected to the feedback terminal of the frequency control circuit 106 by way of input resistors 141, 142 of the frequency control circuit 106.

Of the feedback circuit 107 having the above described configuration, the differential amplifier 131 detects the voltage obtained by dividing the DC output voltage (Vout) applied to the load 101 by means of the dividing resistors 136, 137 and the error voltage representing the difference between that voltage and the reference voltage (Vref) obtained from the reference voltage source 132. The error voltage is then input to the feedback terminal of the frequency control circuit 106 by way of the photocoupler 133.

The frequency control circuit 106 controls the oscillation frequency of the frequency control signal it supplies to the first and second converters 104 and 105 according to the error voltage input to the feedback terminal. More specifically, the frequency control circuit 106 raises the oscillation frequency of the frequency control signal when the voltage obtained by dividing the DC output voltage (Vout) by means of the dividing resistors 136, 137 is higher than the reference voltage (Vref). The frequency control circuit 106 lowers the oscillation frequency of the frequency control signal when the voltage obtained by dividing the DC output voltage (Vout) by means of the dividing resistors 136, 137 is lower than the reference voltage (Vref).

Note that the electric power transmitted to the secondary winding 117b of the insulating transformer 117 of the first converter 104 and the second converter 105 is expressed by "the voltage applied to the primary winding 117a"× "resonance current flowing through the primary winding 117a". As described above, the resonance current flowing through the primary winding 117a of the insulating transformer 117 of either of the first and second converters 104, 105 shows a substantially sinusoidal waveform. Therefore, the power transmitted to the secondary winding 117b is raised when the switching frequency of the resonance current falls and lowered when the switching frequency of the resonance current rises. Thus, the power transmitted to the secondary winding 117b can be controlled by making the switching frequency of the resonance current variable.

In the above described known power supply device 100, the oscillation frequency of the frequency control signal is changed as a function of the DC output voltage (Vout) applied to the load 101 in a manner as described above.

To be more accurate, the feedback circuit 107 compares the DC output voltage (Vout) applied to the load 101 with the reference voltage (Vref) and, if the DC output voltage (Vout) falls below the reference voltage, it lowers the input voltage of the feedback terminal of the frequency control circuit 106, whereas, if the DC output voltage (Vout) rises above the reference voltage, it raises the input voltage of the feedback terminal of the frequency control circuit 106. Then, the frequency control circuit 106 raises the oscillation frequency of the frequency control signal to lower the DC voltage output (Vout) of the first converter 104 and the second converter 105 when the input voltage of the feedback terminal is high. On the other hand, the frequency control circuit 106 lowers the oscillation frequency of the frequency control signal to raise the DC voltage output (Vout) of the first converter 104 and the second converter 105 when the input voltage of the feedback terminal is low.

With the above described control operation, the known power supply device 100 can supply a stabilized DC voltage to the load 101.

Meanwhile, the first converter 104 and the second converter 105 of the above known power supply device 100 are switched for operation by a same frequency control signal in a manner as described above. In other words, they are operated with a same switching frequency. Thus, the resonance current can differ between the first converter 104 and the second converter 105 if there is any discrepancy between them in terms of the impedance of the insulating transformer 117, the impedance, the capacitance of the resonance capacitor 118, the coupling of the primary winding 117a and the secondary winding 117b of the insulating transformer 117 and the impedance of the secondary side of the insulating transformer 117. Since the voltage applied to the first converter 104 and the one applied to the second converter 105 have a same value, the power output is no longer equally shared by the two converters if the resonance current differs between the first and second converters 104 and 105.

The inductance of an insulating transformer normally fluctuates to an extent of about ±10 to 15%. Similarly, the capacitance of a capacitor normally fluctuates to an extent of about ±3 to 5%. Therefore, there arise a difference of about 20 to 30% between the first and second converters 104 and 105 in terms of their shares of the power output if only the fluctuations in the inductance of the insulating transformer and those in the capacitance of the capacitor are taken into consideration.

In a power supply device comprising a plurality of resonance type switching converters connected in parallel, if the power output is equally shared by the converters, those bearing the power output to a large extent have to be subjected to large stress at the cost of the service life their components and their reliability. Additionally, in the case of a power supply device showing a high power output level that exceeds 500 to 1,000W, the power output is made to change enormously relative to the switching frequency for the purpose of achieving a high efficiency. Thus, it is highly desirable that the converters of such a power supply device equally share the power output. If the first and second converters 104 and 105 of the above described power supply device 100 share the power output at a ratio of 7:3 and the share of the converter that normally bears 70% of the power output is raised abruptly, the device can shut down because the converter can no longer bear the excessive load.

BRIEF SUMMARY OF THE INVENTION

In view of the above identified circumstances, it is therefore the object of the present invention to provide a power supply device comprising a plurality of resonance type switching converters connected in parallel and adapted to equally share the power output of the device.

According to the invention, the above object is achieved by providing a power supply device comprising:

a plurality of resonance type switching converters connected in parallel, each having:

a transformer;

a switching circuit for switching the electric flowing through the primary winding of said transformer;

a resonance circuit for regulating the electric current flowing through the primary winding of said transformer to show a substantially sinusoidal waveform; and a rectifying/smoothing circuit for rectifying/smoothing the output voltage obtained at the secondary winding of said transformer;

the outputs of said rectifying/smoothing circuits of said plurality of resonance type switching converters being connected to a single load;

a voltage detection means for detecting the voltage applied to said load;

a comparison means for detecting the electric current flowing through the primary winding of the transformer of each of said plurality of resonance type switching converters and comparing the detected electric currents of the primary windings of the transformers; and a plurality of switching control means for controlling the respective switching frequencies of the switching circuits of said plurality of resonance type switching converters on the basis of the voltage applied to the load as detected by said voltage detection means and the outcome of said comparison of said comparison means;

said switching control means being adapted to control the respective switching frequencies of said switching circuits so as to make the voltage applied to the load as detected by said voltage detection means have a predetermined value and also control the switching frequencies of said switching circuits so as to make the electric currents flowing through the primary windings of said transformers have a same wave height.

Thus, a plurality of current resonance type switching converters are connected to the load in a power supply device according to the invention. Additionally, the resonance currents flowing through the respective resonance type switching converters are detected and so controlled as to show a same wave height.

Thus, in a power supply device according to the invention and comprising a plurality of resonance type switching converters connected to a load, the resonance currents flowing through the respective resonance type switching converters are so controlled as to show a same wave height.

As a result, a power supply device according to the invention can supply a large output to the load. At the same time, a power supply device according to the invention is highly reliable because the resonance type switching converters are so controlled as to provide a same power output. Additionally, in view of the fact that the temperature rise of the heat-emitting components of the device can significantly affect the service life of the latter, they are so controlled as to show a uniform pattern of temperature rise. Still additionally, since the load of a power supply device according to the invention is shared evenly and equally by the resonance type switching converters, the device can adapt itself to an abrupt increase of the load and avoid system errors such as accidental shut downs.

DETAILED DESCRIPTION OF THE INVENTION

Now, the present invention will be described by referring to the accompanying drawings that illustrate preferred embodiments of the invention.

Figure 1:
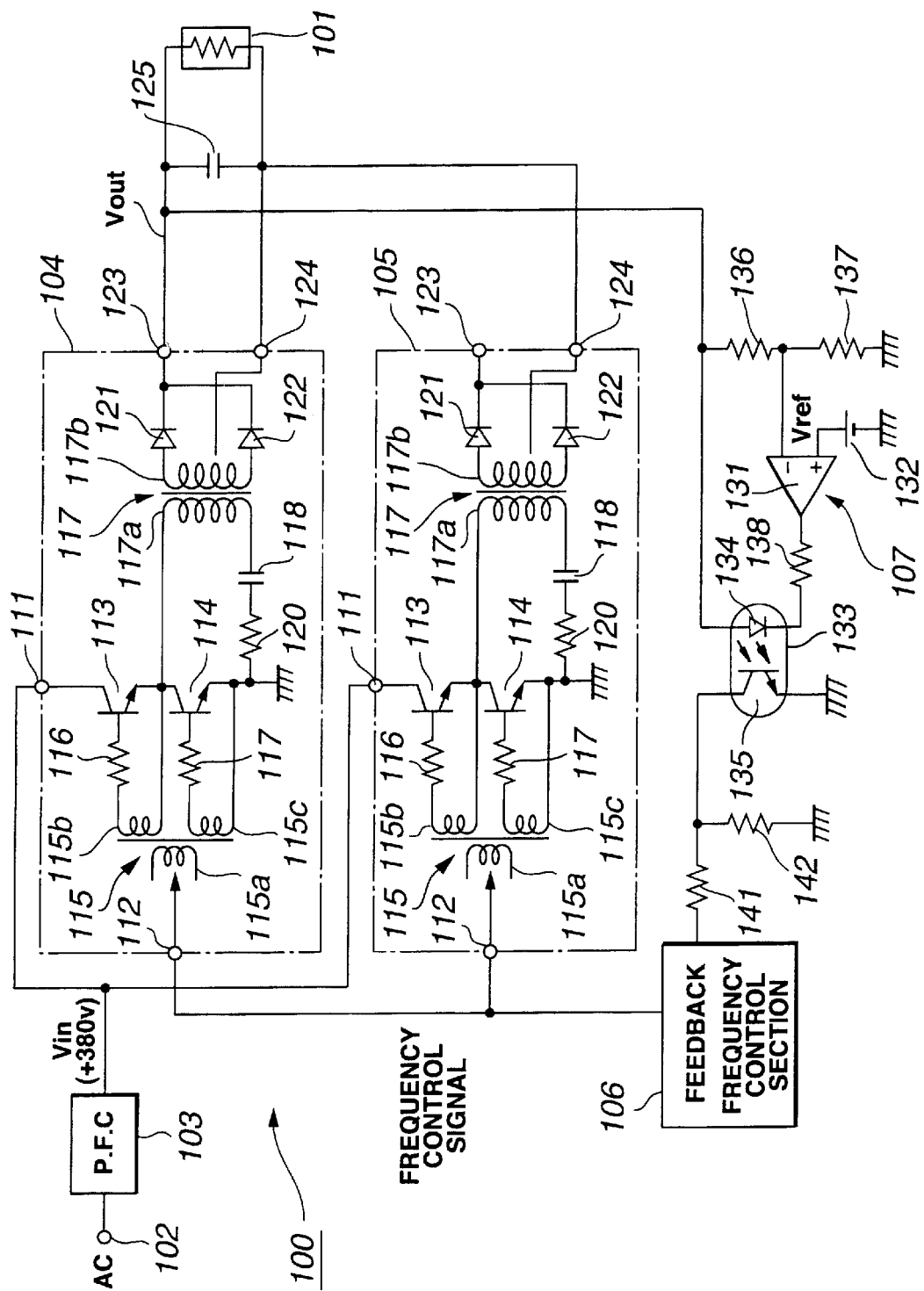
FIG. 1 is a schematic circuit diagram of a known power supply device.
Figure 2:
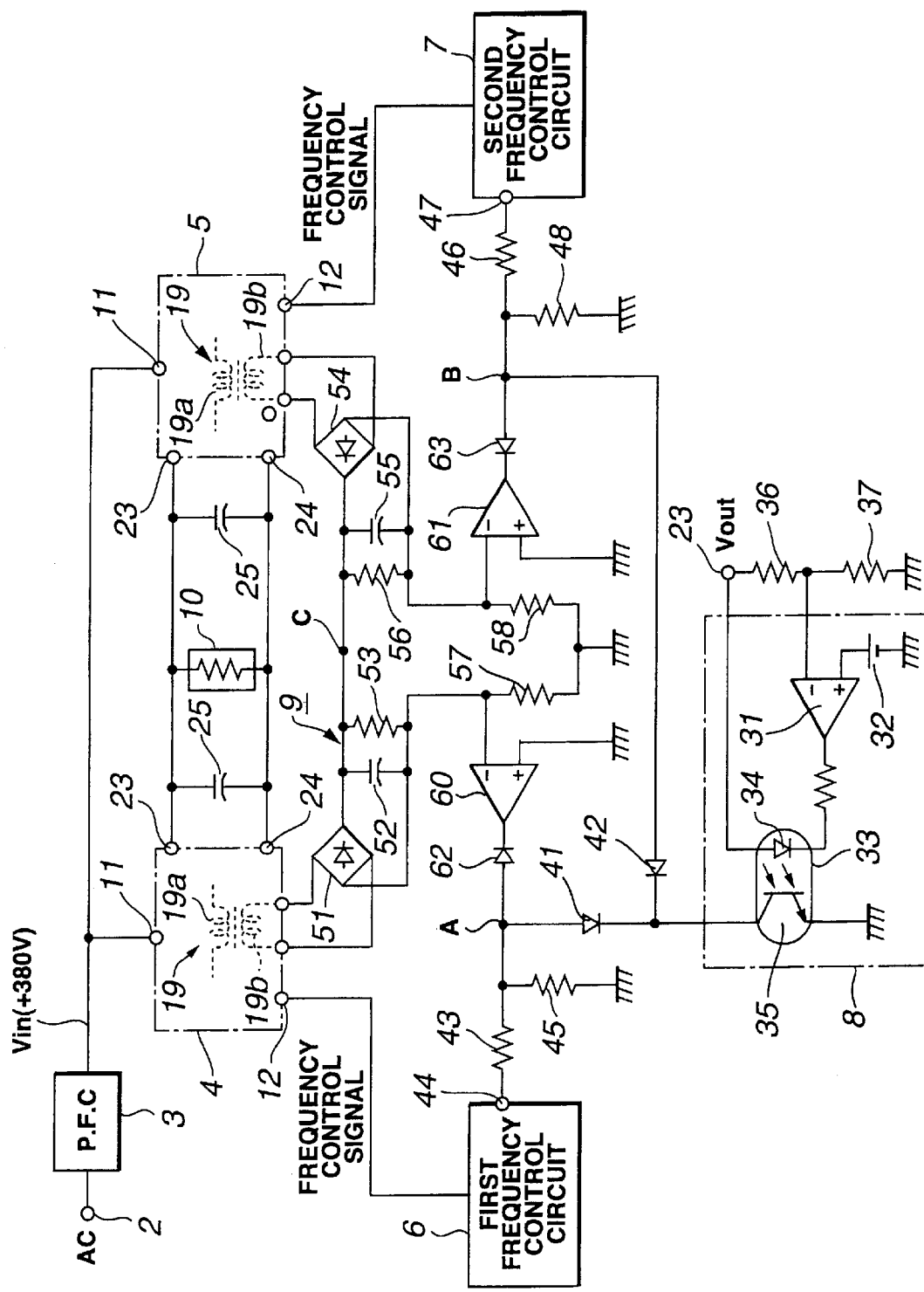
FIG. 2 is a schematic circuit diagram of an embodiment of power supply device according to the invention.

FIG. 2 is a schematic circuit diagram of an embodiment of power supply device according to the invention.

The power supply device 1 of FIG. 2 comprises a plurality of current resonance type switching converters connected in parallel to a load.

The power supply device 1 comprises an AC input terminal 2, a power factor improving circuit (P. F. C.) 3, a first current resonance type switching converter 4, a second current resonance type switching converter 5, a first frequency control circuit 6, a second frequency control circuit 7, a feedback circuit 8 and a resonance current balance circuit 9. A power supply device 1 having such a configuration can supply the load with a DC output voltage (Vout) showing a predetermined voltage value.

Typically a commercial AC voltage is applied to the power supply device 1 by way of the AC input terminal 2. The applied AC voltage is then fed to the power factor improving circuit 3. After boosting the applied AC voltage and improving its power factor, the power factor improving circuit 3 rectifies the AC and outputs a DC input voltage (Vin) that may be for instance as high as 380(V).

The DC input voltage (Vin) is then fed to the first current resonance type switching converter 4 and the second current resonance type switching converter 5. Note that, hereinafter, the first current resonance type switching converter 4 and the second current resonance type switching converter 5 are referred to simply as the first converter 4 and the second converter 5 respectively.

The first converter 4 is controlled for its switching frequency by a frequency control signal from the first frequency control circuit 6 and converts the DC input voltage (Vin) it receives into a DC output voltage (Vout) that is stabilized to show a predetermined voltage value. Similarly, the second converter 7 is also controlled for its switching frequency by a frequency control signal from the second frequency control circuit 7 and converts the DC input voltage (Vin) it receives into a DC voltage (Vout) that is stabilized to show a predetermined voltage value. The output terminal of the first converter 4 and that of the second converter 5 are connected in parallel and are used to supply the load 10 with their respective DC outputs (Vout). The first and second frequency control circuits 6 and 7 output respective pulse signals as their frequency control signals whose frequency varies with a duty ratio of 50%.

Figure 3:
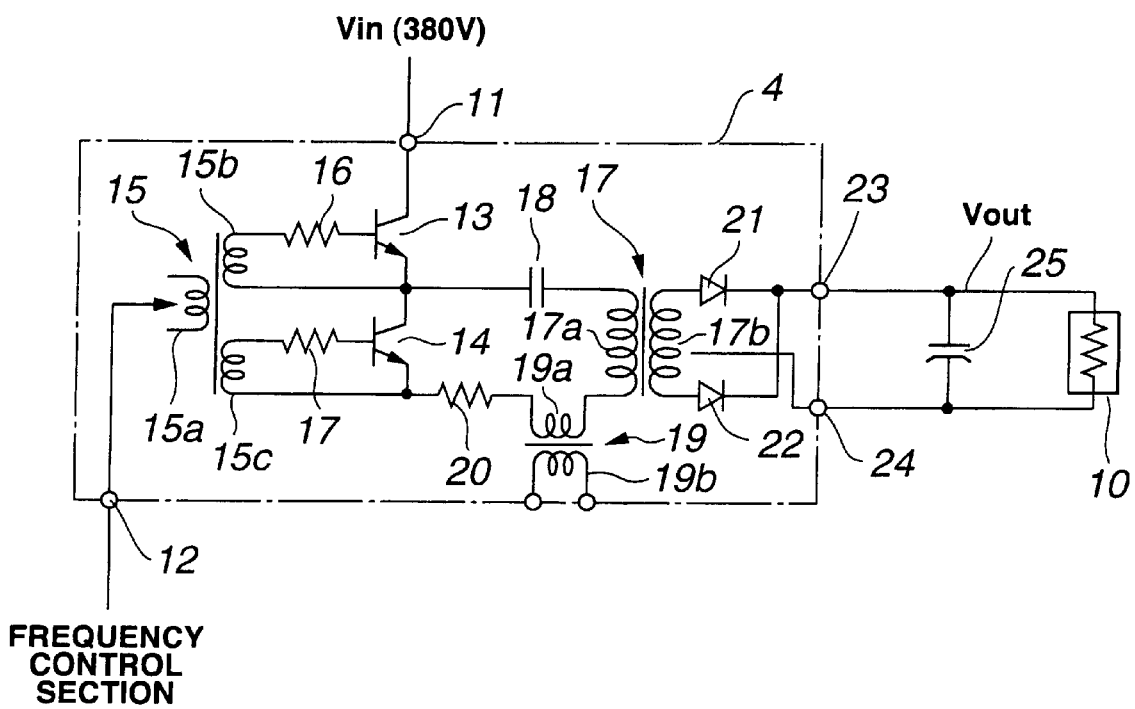
FIG. 3 is a schematic circuit diagram of the current resonance type switching converters of the embodiment of FIG. 2.

Now, the first converter 4 will be described by referring to FIG. 3. The first converter 4 is provided with a DC input terminal 11 and the DC input voltage (Vin) is applied to it by way of the input terminal 11. The first converter 4 is also provided with a control signal input terminal 12 and a frequency control signal is applied to it from the first frequency control circuit 6 by way of the control signal input terminal 12.

The first converter 4 has a first switching transistor 13 and a second switching transistor 14. The collector of the first switching transistor 13 is connected to said DC input terminal 11. The collector of the second switching transistor 14 is connected to the emitter of the first switching transistor 13, which emitter is then grounded.

The first converter 4 also has a driving transformer 15 for driving the first switching transistor 13 and the second switching transistor 14.

The driving transformer 15 includes a primary winding 15a and a pair of secondary windings 15b, 15c. The primary winding 15a of the driving transformer 15 is fed with the frequency control signal sent from the first frequency control circuit 6 by way of the control signal input terminal 12. The two secondary windings 15b, 15c of the driving transformer 15 are wound in opposite directions. One of the secondary windings, or the secondary winding 15b, is connected at an end thereof to the base of the first switching transistor 13 by way of resistor 16 and at the other end thereof to the emitter of the switching transistor 13. On the other hand, the other secondary winding, or the secondary winding 15c, is connected at an end thereof to the base of the second switching transistor 14 and at the other end thereof to the emitter of the second switching transistor 14.

The first switching transistor 13 and the second switching transistor 14 connected respectively to the two secondary windings 15b, 15c of the driving transformer 15 that are wound in opposite directions are complementarily switched according to the frequency control signal input to the primary winding 15a of the driving transformer 15.

The first converter 4 includes an insulating transformer 17, a resonance capacitor 18 and a current transformer 19 arranged at the primary side of the insulating transformer 17 and first and second rectifier diodes 21 and 22 arranged at the secondary side of the insulating transformer 17.

The primary winding 17a of the insulating transformer 17 is connected at an end thereof by way of the resonance capacitor 18 to the emitter of the first switching transistor 13 and grounded at the other end thereof by way of the primary winding 19a of current transformer 19 and resistor 20. The secondary winding 17b of the insulating transformer 17 is connected at an end thereof to the anode of the first rectifier diode 21 and at the other end thereof to the anode of the second rectifier diode 22. The cathode of the first rectifier diode 21 and that of the second rectifier diode 22 are connected to positive side output terminal 23, whereas negative side output terminal 24 is connected to the middle point of the secondary winding 17b of the insulating transformer 17.

Figure 4A:
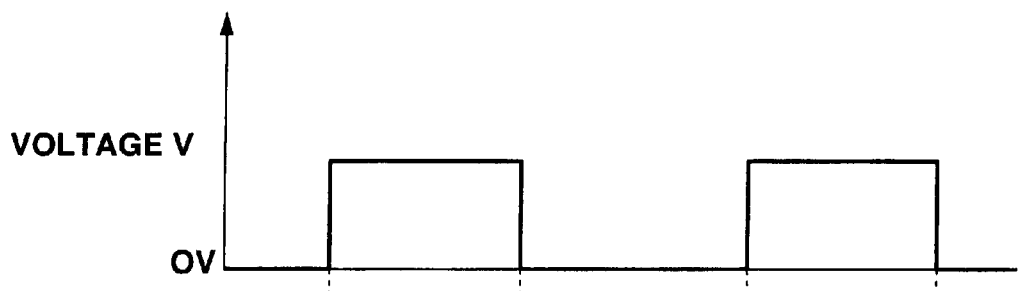
FIGS. 4A and 4B are waveform diagrams of one of the current resonance type switching converters of the embodiment of FIG. 2, illustrating the resonance current.
Figure 4B:
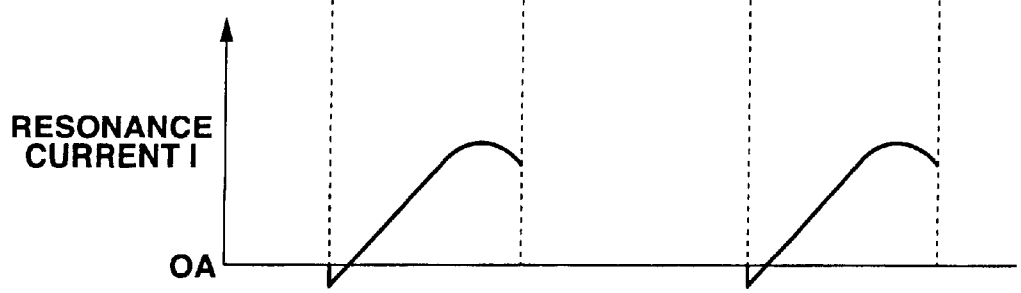

When the first switching transistor 13 and the second switching transistor 14 of the first converter 4 having the above described configuration are complementarily and repeatedly turned on and off according to the frequency control signal from the first frequency control circuit 6, a voltage having a rectangular waveform as shown in (A) of FIG. 4 is applied to the opposite ends of the primary winding 17a of the insulating transformer 17. As a voltage having such a rectangular waveform is applied, a resonance current having a sinusoidal waveform as shown in (B) of FIG. 4 flows through the primary winding 17a as a concerted effect of the capacitance of the resonance capacitor 18 and the inductance of the insulating transformer 17 and the current transformer 19. It should be noted that a resonance current flows through the primary winding 17a only when such a voltage as shown in (B) of FIG. 4 is applied to the opposite ends of thereof. As a resonance current flows through the primary winding 17a, the energy applied to the primary winding 17a is transferred to the secondary winding 17b to cause an electric current to flow therethrough. The electric current flowing through the secondary winding 17b is rectified by the two rectifier diodes 21, 22 and output from the positive side output terminal 23.

Load 10 is connected between the positive side output terminal 23 and the negative side output terminal 24 of the first converter 4 having the above described configuration. Additionally, a smoothing capacitor 25 is arranged between the positive side output terminal 23 and the negative side output terminal 24 so that a stabilized DC output current (Vout) is fed to the load 10 from the first converter 4 with a predetermined voltage value.

The second converter 5 has a configuration same as that of the first converter 4.

A DC input voltage (Vin) is applied to the DC input terminal 11 of the second converter 5 and a frequency control signal is fed from the second frequency control circuit 7 to the control signal input terminal 12 of the second converter 5.

The load 10 is also connected between the positive side output terminal 23 and the negative side output terminal 24 of the second converter 5 having the above described configuration. Additionally, a smoothing capacitor 25 is arranged between the positive side output terminal 23 and the negative side output terminal 24 so that a stabilized DC output current (Vout) is fed to the load 10 from the second converter 5 with a predetermined voltage value.

The feedback circuit 8 has a differential amplifier 31, a reference voltage source 32 and a photocoupler 33.

The inverting input terminal of the differential amplifier 31 is connected to the connection point of potential dividing resistors 36 and 37 for dividing the DC output voltage (Vout) applied to the load 10. The non-inverting input terminal of the differential amplifier 31 is connected to the reference voltage source 32 adapted to generate reference voltage (Vref).

The photocoupler 33 has a light emitting element which is a light emitting diode 34 and a light receiving element which is a phototransistor 35. The anode of the light emitting diode 34 of the photocoupler 33 is connected to the positive side output terminals 23 of the first and second converters 4 and 5. The cathode of the light emitting diode 34 of the photocoupler 33 is connected to the output terminal of the differential amplifier 31 by way of resistor 38.

The emitter of the phototransistor 35 of the photocoupler 33 is grounded. The collector of the phototransistor 35 of the photocoupler 33 is connected to the cathode of a first diode 41 and also to the cathode of a second diode 42. The anode of the first diode 41 is connected to connection point A, while the anode of the second diode 42 is connected to connection point B.

The connection point A is connected to the feedback terminal 44 of the first frequency control circuit 6 by way of input resistor 43. A voltage changing resistor 45 is connected between the connection point A and the ground. The connection point B is connected to the feedback terminal 47 of the second frequency control circuit 7 by way of input resistor 46. A voltage changing resistor 48 is connected between the connection point B and the ground.

Of the feedback circuit 8 having the above described configuration, the differential amplifier 31 detects the voltage obtained by dividing the DC output voltage (Vout) applied to the load 10 by means of the dividing resistors 36, 37 and the error voltage representing the difference between that voltage and the reference voltage (Vref) obtained from the reference voltage source 32. The error voltage is then input to the feedback terminal 44 of the first frequency control circuit 6 and the feedback terminal 47 of the second frequency control circuit 7.

The first frequency control circuit 6 controls the oscillation frequency of the frequency control signal it supplies to the first converters 4 according to the error voltage input to the feedback terminal 44. More specifically, the first frequency control circuit 6 raises the oscillation frequency of the frequency control signal when the voltage obtained by dividing the DC output voltage (Vout) by means of the dividing resistors 36, 37 is higher than the reference voltage (Vref). The first frequency control circuit 6 lowers the oscillation frequency of the frequency control signal when the voltage obtained by dividing the DC output voltage (Vout) by means of the dividing resistors 36, 37 is lower than the reference voltage (Vref). Similarly, the second frequency control circuit 7 controls the oscillation frequency of the frequency control signal it supplies to the second converter 5 according to the error voltage input to the feedback terminal 47. More specifically, the second frequency control circuit 7 raises the oscillation frequency of the frequency control signal when the voltage obtained by dividing the DC output voltage (Vout) by means of the dividing resistors 36, 37 is higher than the reference voltage (Vref). The second frequency control circuit 7 lowers the oscillation frequency of the frequency control signal when the voltage obtained by dividing the DC output voltage (Vout) by means of the dividing resistors 36, 37 is lower than the reference voltage (Vref).

Note that the electric power transmitted to the secondary winding 17b of the insulating transformer 17 of the first converter 4 and the secondary winding 17b of the insulating transformer 17 of the second converter 5 is expressed by "the voltage applied to the primary winding 17a"× "resonance current flowing through the primary winding 17a". As described above, the resonance current flowing through the primary winding 17a of the insulating transformer 17 of either of the first and second converters 4, 5 shows a substantially sinusoidal waveform. Therefore, the power transmitted to the secondary winding 17b is raised when the switching frequency of the resonance current falls and lowered when the switching frequency of the resonance current rises. Thus, the power transmitted to the secondary winding 17b can be controlled by making the switching frequency of the resonance current variable.

In the above described known power supply device 1, the first frequency control circuit 6 and the second frequency control circuit 7 change the oscillation frequency of the frequency control signal as a function of the DC output voltage (Vout) applied to the load 10 in a manner as described above.

To be more accurate, the feedback circuit 8 compares the DC output voltage (Vout) applied to the load 10 with the predetermined reference voltage (Vref) and, if the DC output voltage (Vout) falls below the reference voltage, it lowers the input voltage of the feedback terminals 44, 47 of the first and second frequency control circuits 6 and 7, whereas, if the DC output voltage (Vout) rises above the reference voltage, it raises the input voltage of the feedback terminals 44, 47 of the first and second frequency control circuits 6 and 7. Then, the first and second frequency control circuits 6 and 7 raise the oscillation frequency of the frequency control signal to lower the DC voltage output (Vout) of the first converter 4 and the second converter 5 when the input voltage of the feedback terminals 44, 47 is high. On the other hand, the first and second frequency control circuits 6 and 7 lower the oscillation frequency of the frequency control signal to raise the DC voltage output (Vout) of the first converter 4 and the second converter 5 when the input voltage of the feedback terminal is low.

With the above described control operation, the power supply device 1 can supply a stabilized DC voltage to the load 10.

The above described power supply device 1 additionally comprises a resonance current balance circuit 9.

The resonance current balance circuit 9 has a first rectifying circuit 51 for rectifying the electric current flowing to the secondary winding 19b of the current transformer 19 of the first converter 4, a first capacitor 52 for smoothing the electric current rectified by the first rectifying circuit 51 and a first resistor 53 connected in parallel with the first capacitor 52 between the opposite ends thereof. The resonance current balance circuit 9 additionally has a second rectifying circuit 54 for rectifying the electric current flowing to the secondary winding 19b of the current transformer 19 of the second converter 5, a second capacitor 55 for smoothing the electric current rectified by the second rectifying circuit 54 and a second resistor 56 connected in parallel with the second capacitor 55 between the opposite ends thereof.

One of the ends of the first capacitor 52 and that of the first resistor 53 are connected to connection point C. Similarly, one of the ends of the second capacitor 55 and that of the second resistor 56 are connected to the connection point C.

The resonance current balance circuit 9 also has a first balance resistor 57 and a second balance resistor 58. The first balance resistor is connected at an end thereof to the other end of the first resistor 53 that is not connected to the connection point C and at the other end thereof to the ground. The second balance resistor is connected at an end thereof to the other end of the second resistor 56 that is not connected to the connection point C and at the other end thereof to the ground.

The resonance current balance circuit 9 also has a first operational amplifier 60 and a second operational amplifier 61. The inverting input terminal of the first operational amplifier 60 is connected to the end of the first balance resistor 57 that is not grounded, whereas the non-inverting input terminal of the first operational amplifier 60 is grounded. The inverting input terminal of the second operational amplifier 61 is connected to the end of the second balance resistor 58 that is not grounded, whereas the non-inverting input terminal of the second operational amplifier 61 is grounded. The resonance current balance circuit 9 additionally has a diode 62 having its anode connected to the connection point A and its cathode connected to the output terminal of the first operational amplifier 60 and another diode 63 having its anode connected to the connection point B and its cathode connected to the output terminal of the second operational amplifier 61.

A resonance current showing a sinusoidal waveform flows through the primary winding 19a of the current transformer 19 of the first converter 4. Therefore, an electric that corresponds to the resonance current flows through the secondary winding 19b of the current transformer 19 of the first converter 4. The electric current generated in the secondary winding 19b of the current transformer 19 of the first converter 4 is rectified by the first rectifying circuit 51 and then smoothed by the first capacitor 52. Thus, a voltage that corresponds to the wave height of the resonance current flowing through the first converter 4 is generated between the opposite ends of the first resistor 53.

Similarly, a resonance current showing a sinusoidal waveform flows through the primary winding 19a of the current transformer 19 of the second converter 5. Therefore, an electric that corresponds to the resonance current flows through the secondary winding 19b of the current transformer 19 of the second converter 5. The electric current generated in the secondary winding 19b of the current transformer 19 of the second converter 5 is rectified by the second rectifying circuit 54 and then smoothed by the second capacitor 55. Thus, a voltage that corresponds to the wave height of the resonance current flowing through the second converter 5 is generated between the opposite ends of the second resistor 56.

If the voltage generated between the opposite ends of the first resistor 53 and the voltage generated between the opposite ends of the second resistor 56 differ from each other, the state of equilibration between the first and second converters is lost and oppositely directed electric currents flows respectively through the first balance resistor 57 and the second balance resistor 58. More specifically, no electric current flows through the first balance resistor 57 and the second balance resistor 58 so long as the wave height of the resonance current of the first converter 4 and that of the resonance current of the second converter 5 are equal to each other. However, once the wave height of the resonance current of the first converter 4 and that of the resonance current of the second converter 5 are differentiated, oppositely directed electric currents flows respectively through the first balance resistor 57 and the second balance resistor 58.

As oppositely directed electric currents flows respectively through the first balance resistor 57 and the second balance resistor 58, the voltage applied to the feedback terminal 44 of the first frequency control circuit 6 and the voltage applied to the feedback terminal 47 of the second frequency control circuit 7 are complementarily subjected to fine adjustment. Then, the first frequency control circuit 6 and the second frequency control circuit 7 transmit respective frequency control signals having different oscillation frequencies to the first converter 4 and the second converter 5. As a result, the resonance current flowing through the first converter 4 and the resonance current flowing through the second converter 5 are so controlled as to show a same wave height.

More specifically, if the wave height of the resonance current of the first converter 4 is higher than that of the resonance current of the second converter 5, the device operates in a manner as described below.

The first operational amplifier 60 inverts the voltage generated at the first balance resistor 57 and applies it to the feedback terminal 44 of the first frequency control circuit 6 by way of the connection point A. Thus, the voltage applied by the first operational amplifier 60 is added to the voltage fed back from the feedback circuit 8. As a result, the voltage being applied to the first frequency control circuit 6 rises. As the voltage input to its feedback terminal 44 rises, the first frequency control circuit 6 raises the oscillation frequency of the frequency control signal supplied to the first converter 4 in order to lower the wave height of the resonance current of the first converter 4.

The second operational amplifier 61 inverts the voltage generated at the second balance resistor 58 and applies it to the feedback terminal 47 of the second frequency control circuit 7 by way of the connection point B. Thus, the voltage applied by the second operational amplifier 61 is subtracted from the voltage fed back from the feedback circuit 8. As a result, the voltage being applied to the second frequency control circuit 7 falls. As the voltage input to its feedback terminal 47 falls, the second frequency control circuit 7 lowers the oscillation frequency of the frequency control signal supplied to the second converter 5 in order to raise the wave height of the resonance current of the second converter 5.

On the other hand, if the wave height of the resonance current of the first converter 4 is lower than that of the resonance current of the second converter 5, the device operates in a manner as described below.

The first operational amplifier 60 inverts the voltage generated at the first balance resistor 57 and applies it to the feedback terminal 44 of the first frequency control circuit 6 by way of the connection point A. Thus, the voltage applied by the first operational amplifier 60 is subtracted from the voltage fed back from the feedback circuit 8. As a result, the voltage being applied to the first frequency control circuit 6 falls. As the voltage input to its feedback terminal 44 falls, the first frequency control circuit 6 lowers the oscillation frequency of the frequency control signal supplied to the first converter 4 in order to raise the wave height of the resonance current of the first converter 4.

The second operational amplifier 61 inverts the voltage generated at the second balance resistor 58 and applies it to the feedback terminal 47 of the second frequency control circuit 7 by way of the connection point B. Thus, the voltage applied by the second operational amplifier 61 is added to the voltage fed back from the feedback circuit 8. As a result, the voltage being applied to the second frequency control circuit 7 rises. As the voltage input to its feedback terminal 47 rises, the second frequency control circuit 7 raises the oscillation frequency of the frequency control signal supplied to the second converter 5 in order to lower the wave height of the resonance current of the second converter 5.

Thus, in the power supply device 1, the feedback circuit 8 controls the DC output voltage (Vout) so as to make it show a stabilized voltage value and the resonance current balance circuit 9 performs a fine adjustment operation of making the resonance current flowing through the first converter 4 and the resonance current flowing through the second converter 5 to show a same wave height.

The first converter 4 and the second converter 5 are connected in parallel in the power supply device 1 and hence the DC input voltage (Vin) is used commonly by them. As pointed out above, the power transmitted to the secondary winding 17b of the insulating transformer 17 of the first converter 4 and that of the second converter 5 is expressed by voltage×resonance current. Thus, the two converters can be made to equally share the power by controlling the resonance current flowing through the first converter 4 and the resonance current flowing through the second converter 5 so as to make them show a same wave height.

As described above, because the first current resonance type switching converter 5 and the second current resonance type switching converter 6 are connected to the load in parallel, the power supply device 1 can supply a large output to the load 10. At the same time, since the two switching converters 5 and 6 of the power supply device 1 are made to output power with a same power level, the power supply device 1 operates highly reliably. Additionally, the temperature rise of the components liable to generate heat is minimized and equalized to prolong their service life. Still additionally, since the two switching converters 5 and 6 of the power supply device 1 are made to equally share the power it supplies, it can adapt itself to an abrupt increase of the load and avoid system errors such as accidental shut downs.

While two current resonance type switching converters are connected in parallel in the above described embodiment of power supply device 1, the present invention is by no means limited thereto and a power supply device 1 according to the invention may alternatively comprise three or more than three switching converters that are connected in parallel to the load. Then, it should be so arranged that the resonance current balance circuit 9 of the device detects the resonance currents of all the switching converters and compares them for the purpose of equal sharing of the power output of the device.

Additionally, the resonance current balance circuit 9 of a power supply device 1 according to the invention may have any appropriate circuit configuration that is different from the above described one so long as it is adapted to detect and compare the electric currents flowing through the primary windings of the transformers.

Now an alternative resonance current balance circuit obtained by modifying the above described resonance current balance circuit 9 will be described below.

Figure 5:
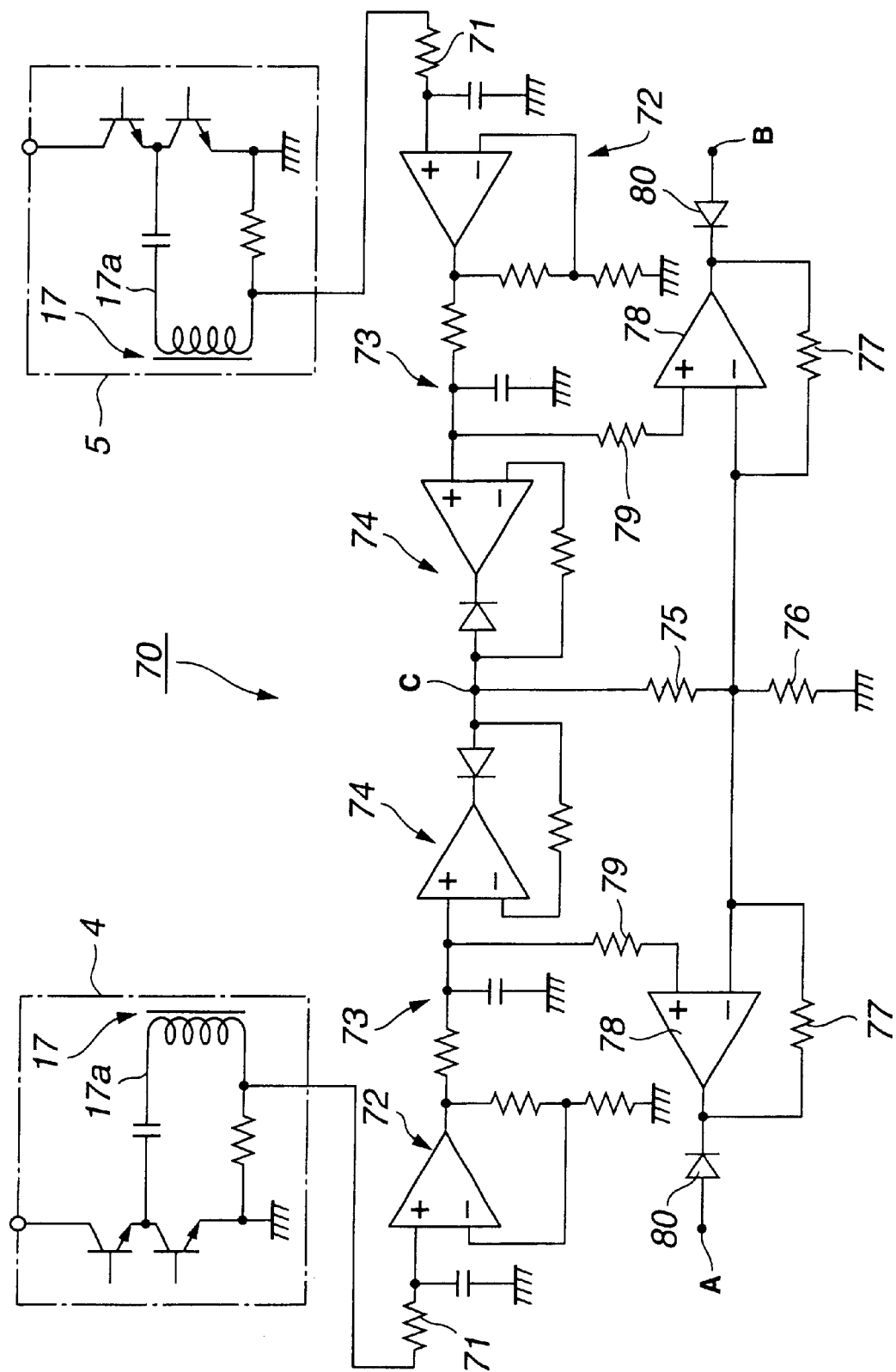
FIG. 5 is a schematic circuit diagram of a resonance current balance circuit of the embodiment of FIG. 2 obtained by modifying the original one.

FIG. 5 is a schematic circuit diagram of a resonance current balance circuit 70 of the embodiment of FIG. 2 obtained by modifying the above described resonance current balance circuit 9.

The resonance current balance circuit 70 has a resonance current detecting resistor 71 having an end thereof connected to an end of the primary winding 17a of the first converter 4. The resonance current is detected from the resonance current detecting resistor 71. Since the resonance current balance circuit 70 detects the resonance current by means of the resonance current detecting resistor 71, the first converter 4 does not need the current transformer 19.

The resonance current balance circuit 70 also has an I/V conversion circuit 72 for I/V converting the resonance current connected to the other end of the resonance current detecting resistor 71 and a smoothing circuit 73 for smoothing the I/V converted voltage. The resonance current balance circuit 70 additionally has a buffer circuit 74 arranged between the smoothing circuit 73 and the connection point C.

Note that the second converter 5 is also provided with a resonance current detecting resistor 71, an I/V conversion circuit 72, a smoothing circuit 73 and a buffer current 74 in a manner as described above.

The connection point C is grounded by way of serially connected resistors 75 and 76.

The resonance current balance circuit 70 also has an operational amplifier 78 having its inverting input terminal and output terminal connected together by way of a resistor 77. The non-inverting input terminal of the operational amplifier 78 is connected to the smoothing circuit 73 by way of a balance resistor 79 and its inverting input terminal is connected to the connection point of the resistor 75 and the resistor 76. The resonance current balance circuit 70 additionally has a diode 80 having its cathode connected to the output terminal of the operational amplifier 78.

Note that the second converter 5 is also provided with an operational amplifier 78, a resistor 77, a balance resistor 79 and a diode 80 in a manner as described above.

Of the resonance current balance circuit 70, the diode 80 at the side of the first converter 4 is connected to the connection point A while the diode 80 at the side of the second converter 5 is connected to the connection point B.

The resonance current balance circuit 70 having the above described configuration is adapted to detect the resonance current of each of the converters by means of a resistor and I/V convert the resonance current. Then, it compares the wave heights of all the resonance currents flowing through the respective converters. Thus, a power supply device 1 comprising such a resonance current balance circuit 70 can carry out a fine adjustment operation of making the resonance currents flowing respectively through the first converter 4 and the second converter 5 to show a same wave height.

Figure 6:
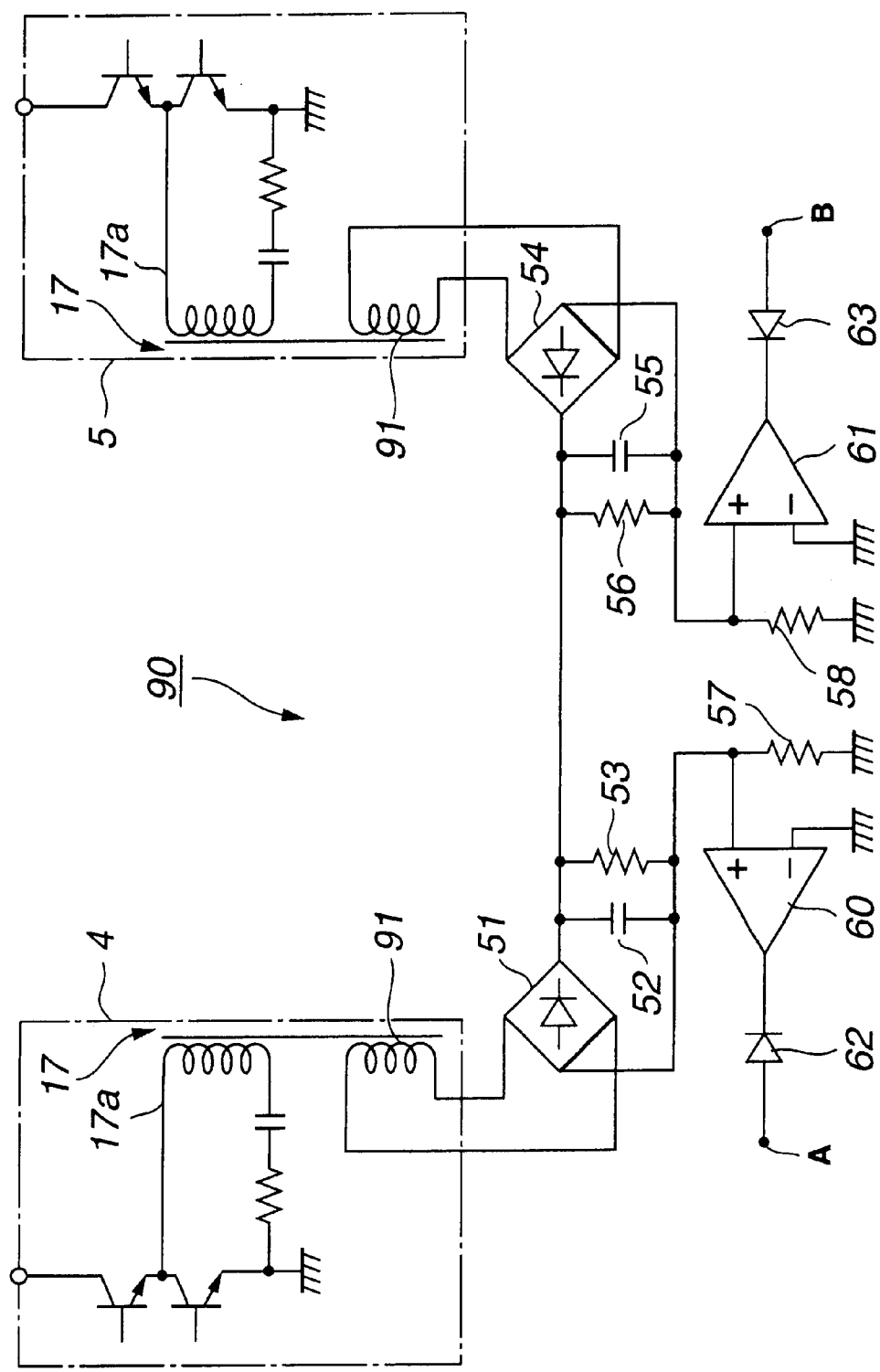
FIG. 6 is a schematic circuit diagram of another resonance current balance circuit of the embodiment of FIG. 2 obtained by modifying the original one.

FIG. 6 is a schematic circuit diagram of another resonance current balance circuit 90 that can be used for the embodiment of FIG. 2 and obtained by modifying the resonance current balance circuit 9.

The resonance current balance circuit 90 of FIG. 6 differs from the original one in that the current transformers 19 are replaced by resonance current detecting windings 91 arranged in the insulating transformers 17 of the first converter 4 and the second converter 5. Thus, the first converter 4 and the second converter 5 do not need to be provided with respective current transformers 19. Otherwise, the resonance current balance circuit 90 has a configuration same as that of the resonance current balance circuit 9. Thus, a power supply device 1 comprising such a resonance current balance circuit 90 can carry out a fine adjustment operation of making the resonance currents flowing respectively through the first converter 4 and the second converter 5 to show a same wave height.

What is claimed is:

1. A power supply device comprising:
   a plurality of resonance type switching converters connected in parallel, each having:
   a transformer;
   a switching circuit for switching the electric flowing through the primary winding of said transformer;
   a resonance circuit for regulating the electric current flowing through the primary winding of said transformer to show a substantially sinusoidal waveform; and
   a rectifying/smoothing circuit for rectifying/smoothing the output voltage obtained at the secondary winding of said transformer;
   the outputs of said rectifying/smoothing circuits of said plurality of resonance type switching converters being connected to a single load;
   a voltage detection means for detecting the voltage applied to said load;
   a comparison means for detecting the electric current flowing through the primary winding of the transformer of each of said plurality of resonance type switching converters and comparing the detected electric currents of the primary windings of the transformers; and
   a plurality of switching control means for controlling the respective switching frequencies of the switching circuits of said plurality of resonance type switching converters on the basis of the voltage applied to the load as detected by said voltage detection means and the outcome of said comparison of said comparison means;
   said switching control means being adapted to control the respective switching frequencies of said switching circuits so as to make the voltage applied to the load as detected by said voltage detection means have a predetermined value and also control the switching frequencies of said switching circuits so as to make the electric currents flowing through the primary windings of said transformers have a same wave height.

2. A power supply device according to claim 1, wherein
   each of said resonance type switching converters has a current transformer to be used as said resonance circuit in order to use the inductance of said primary winding to make the electric current flowing through said primary winding of said transformer show a substantially sinusoidal waveform and
   said comparison means rectifies and smooths the voltage obtained from the secondary winding of each of said current transformer and compares the electric currents flowing through all the primary windings of said transformers arranged in said resonance type switching converters.

3. A power supply device according to claim 1, wherein
   said comparison means detects the resonance current flowing through the primary winding of each of said transformers, converts the detected resonance current into a voltage and compares the electric currents flowing through all the primary windings of said transformers.

4. A power supply device according to claim 1, wherein
   each of said resonance type switching converters has a current detection transformer arranged inside said transformer to detect the electric current flowing through the primary winding of said transformer and
   said comparison means rectifies and smooths the voltage obtained from each of said current detection transformers and compares the electric currents flowing through all the primary windings of said transformers arranged in said resonance type switching converters.

* * * * *